(12) United States Patent
Osaimi

(10) Patent No.: US 12,703,104 B2
(45) Date of Patent: Aug. 11, 2026

(54) SYSTEM AND METHOD FOR MANAGING A DEVICE AND PROVIDING INSTRUCTION FROM A REMOTE LOCATION VIA A VIDEO DISPLAY

(71) Applicant: Rami Ayed Osaimi, Waltham, MA (US)

(72) Inventor: Rami Ayed Osaimi, Waltham, MA (US)

( * ) Notice: Subject to any disclaimer, the term of this patent is extended or adjusted under 35 U.S.C. 154(b) by 64 days.

(21) Appl. No.: 18/705,969

(22) PCT Filed: Nov. 9, 2022

(86) PCT No.: PCT/US2022/049383

§ 371 (c)(1),
(2) Date: Apr. 29, 2024

(87) PCT Pub. No.: WO2023/096749

PCT Pub. Date: Jun. 1, 2023

(65) Prior Publication Data

US 2025/0222591 A1 Jul. 10, 2025

Related U.S. Application Data

(60) Provisional application No. 63/282,587, filed on Nov. 23, 2021.

(51) Int. Cl.
*B25J 9/16* (2006.01)
*H04N 23/661* (2023.01)

(52) U.S. Cl.
CPC ........... *B25J 9/1697* (2013.01); *B25J 9/1664* (2013.01); *H04N 23/661* (2023.01)

(58) Field of Classification Search
CPC ..... B25J 9/1697; B25J 9/1664; H04N 23/661; H04N 7/147; G06F 3/017; G06F 3/0482;
(Continued)

(56) References Cited

U.S. PATENT DOCUMENTS

2011/0087371 A1* 4/2011 Sandberg ............. G05D 1/0038 701/2
2011/0288684 A1* 11/2011 Farlow ................... B25J 19/023 901/1

(Continued)

OTHER PUBLICATIONS

International Search Report from International Application No. PCT/US22/049383, date mailed: Mar. 20, 2023.

*Primary Examiner* — Michael C Zarroli
(74) *Attorney, Agent, or Firm* — Morse, Barnes-Brown & Pendleton PC; Sean D. Detweiler, Esq.

(57) ABSTRACT

A method and system for commanding a device via a video display. The device has a camera directed at the video display and is in communication with a processor. A command displayed on the video display is received by the camera. The processor interprets the command received by the camera and executes the interpreted command by instructing the device to carry out the command. The method and system enables the operation of telepresence devices without the need for a proprietary control mechanism and additional proprietary components. Specialized devices from different manufacturers are enabled to communicate with each other as described herein.

28 Claims, 8 Drawing Sheets

(58) Field of Classification Search
CPC ... G06F 3/04842; G06F 3/04883; G06F 3/167
See application file for complete search history.

(56) References Cited

U.S. PATENT DOCUMENTS

| | | | | |
|---|---|---|---|---|
| 2012/0215380 | A1* | 8/2012 | Fouillade | G05D 1/0038 701/2 |
| 2015/0138333 | A1* | 5/2015 | DeVaul | G06F 3/167 446/175 |
| 2019/0320140 | A1 | 10/2019 | Lyu | |
| 2020/0120308 | A1 | 4/2020 | McMillan et al. | |
| 2021/0257109 | A1 | 8/2021 | Celmins et al. | |
| 2023/0270562 | A1* | 8/2023 | Roh | G16H 30/40 606/1 |
| 2025/0278088 | A1* | 9/2025 | Ebrahimi Afrouzi | G05D 1/246 |

* cited by examiner

SYSTEM AND METHOD FOR MANAGING A DEVICE AND PROVIDING INSTRUCTION FROM A REMOTE LOCATION VIA A VIDEO DISPLAY

CROSS-REFERENCE TO RELATED APPLICATION(S)

This application is a U.S. national stage filing under 35 U.S.C. 371 of International Application No. PCT/US2022/049383, filed on Nov. 9, 2022, which claims priority to, and the benefit of, U.S. Provisional Application 63/282,587, filed Nov. 23, 2021, for all subject matter common to both applications. The disclosures of said applications are hereby incorporated by reference in their entirety. International Application No. PCT/US2022/049383 was published under PCT Article 21(2) in English.

FIELD OF THE INVENTION

The present invention relates to systems and methods suitable for managing or otherwise controlling devices, such as telepresence robots, from a remote location. In particular, the present invention relates to controlling such devices via a video display.

BACKGROUND

Generally, there is an increase in the use of telepresence technology from video calls and conferencing to specialized telepresence robots. This technology allows for a greater level of interactivity approaching in-person interactions, while allowing the participants to be at remote locations from each other.

However, such telepresence technologies experience some shortcomings. Traditionally video call or conferencing technologies such, as Skype®, Zoom®, Facetime®, or Teams® typically only allow a participant to control the technology at their own end of the video conference. That is, the user can control the camera, sound, etc. on their device that is on their end of the video communication. The remote user typically does not have control over the camera, sound, etc. on the other device participating in the video communication. Thus, the remote user cannot adjust the position of the camera to adjust the frame of view displayed on their device. Telepresence devices, such as robots, have been developed to provide increased control. Such devices typically allow a remote user to remotely control the position of the device, allowing the remote user to adjust the frame of view displayed on their device. However, this additional functionality of such telepresence devices involves increased complexity and cost where, in addition to the hardware and software required to implement video communication, additional hardware and software is needed to provide the remote control. Furthermore, the implementation is often proprietary. That is, to control such a telepresence device, the remote user is required to use a specific control mechanism (such as a specific proprietary remote control, or software) designed to control the specific telepresence device remotely. This limits the utility, deployability, and cost feasibility of wide-spread use of such telepresence devices.

SUMMARY

There is a need for a mechanism that simplifies the operation of telepresence devices by eliminating the need for a proprietary control mechanism and additional components. The present invention is directed toward further solutions to address this need, in addition to having other desirable characteristics. Specifically, the present invention provides for a simplified device and system with a camera pointed at a video display associated with the robot or device to be operated. The device is configured to receive and execute commands that are displayed on the video display. The device does not require built-in communication functionality as such functionality can be provided by the personal electronic device that is providing the image on the video display. For example, the video display can be part of a personal computing device, such as a personal computer, tablet, or smartphone which provides remote communication functionality. Similarly, the device does not require additional hardware or software at the remote user's location to provide control of the device. Further, the device does not need to be in electrical communication with the personal computing device, such as over a serial, parallel, ethernet, or wireless (Wi-Fi, Bluetooth®) which further reduces the complexity of the device and in turn makes it more universal as no proprietary or specific ports, protocols, or additional hardware or software are required to interface with and control the device.

In accordance with example embodiments of the present invention, a method for commanding a device via a video display is provided. The device has a camera directed at the video display and is in communication with a processor. The method includes receiving, by the camera, a command displayed on the video display; interpreting, by the processor, the command received by the camera; and executing, by the processor, the interpreted command by instructing the device to carry out the command. Thus, a remote user can control the device without requiring a proprietary control mechanism at the remote user's location.

In accordance with aspects of the present invention, the command comprises an image displayed on the video display. In some such aspects, the command comprises text that is displayed on the video display. In other aspects, the command comprises a gesture that is displayed on the video display.

In accordance with aspects of the present invention, the video display displays content that is sourced from a remote location from the camera and video display. In some such aspects, the video display comprises a screen of a portable electronic device.

In accordance with aspects of the present invention, interpreting the command includes performing image recognition on the command displayed on the video display; and determining when the results of image recognition match a pre-determined trigger for instructing the device to perform the command. In some such aspects, the image recognition comprises gesture recognition. In certain aspects determining when results of image recognition match a pre-determined trigger for instructing the device to perform the command is performed by consulting a listing of commands and triggers.

In accordance with aspects of the present invention, interpreting the command further comprises using machine learning and/or artificial intelligence to determine what command is displayed on the video display and/or the action that is to be carried out in response to the command.

In accordance with aspects of the present invention, the device further includes a microphone and can further receive commands by the microphone that are interpreted and executed by the processor.

In accordance with aspects of the present invention, executing, by the processor, the interpreted command by instructing the device to carry out the command further includes consulting a listing of commands and actions to determine the appropriate action for the received command and performing the determined appropriate action.

In accordance with aspects of the present invention, the device is a telepresence robot. The telepresence robot includes a body, a mount, a camera, a processor, and at least one motor. The mount is configured to support the video display. The camera is directed at the video display on the mount. The processor is in communication with the camera. The at least one motor is in communication with the processor to motivate the body of the robot. The command received by the camera and interpreted and executed by the processor results in actuation of the at least one motor and movement of the telepresence robot in accordance with the command received. In some such aspects, the command received is a command to rotate the body in a specified direction. In other such aspects, the telepresence robot further includes the video display supported by the mount.

In accordance with example embodiments of the present invention, a telepresence robot receiving commands from a remote location via a video display is provided. The robot includes a body, a mount, a camera, a processor, and at least one motor. The mount supports a video display. The camera is directed at the video display on the mount and is oriented to receive video images of commands displayed on the video display. The processor is in communication with the camera and interprets and executes commands received by the camera. The at least one motor is in communication with the processor and motivates at least a portion of the robot. Commands are received by the camera and interpreted and executed by the processor which results in the actuation of the motor and movement of at least a portion of the robot in accordance with the command. Thus, a remote user can control the device without requiring a proprietary control mechanism at the remote user's location.

In accordance with aspects of the present invention, a command comprises an image displayed on the video display. In some aspects, the command comprises text displayed on the video display. In other aspects, the command is a gesture performed by an individual displayed on the video display.

In accordance with aspects of the present invention, the video display displays content sourced from a remote location. In some such aspects, the video display comprises a screen of a portable electronic device.

In accordance with aspects of the present invention, the processor interprets and executes the commands by performing image recognition on the command displayed on the video display and determining when results of image recognition match a pre-determined trigger for instructing the robot to perform the command. In some such aspects, image recognition comprises gesture recognition.

In accordance with aspects of the present invention, the processor interprets and executes the commands by using machine learning and/or artificial intelligence to determine what command is displayed on the video display and/or the action that is to be carried out in response to the command.

In accordance with aspects of the present invention, determining when results of image recognition match a pre-determined trigger for instructing the device to perform the command is performed by consulting a listing of commands and triggers.

In accordance with aspects of the present invention, the processor interprets and executes the commands by consulting a listing of commands and actions to determine the appropriate action for the received command and performing the determined appropriate action.

In accordance with aspects of the present invention, the robot further includes a microphone in communication with the processor for receiving audio commands. A command received by the microphone is interpreted and executed by the processor and results in the actuation of the motor and movement of at least a portion of the robot in accordance with the command.

In accordance with aspects of the present invention, the command received is a command to rotate the body of the robot in a specified direction.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
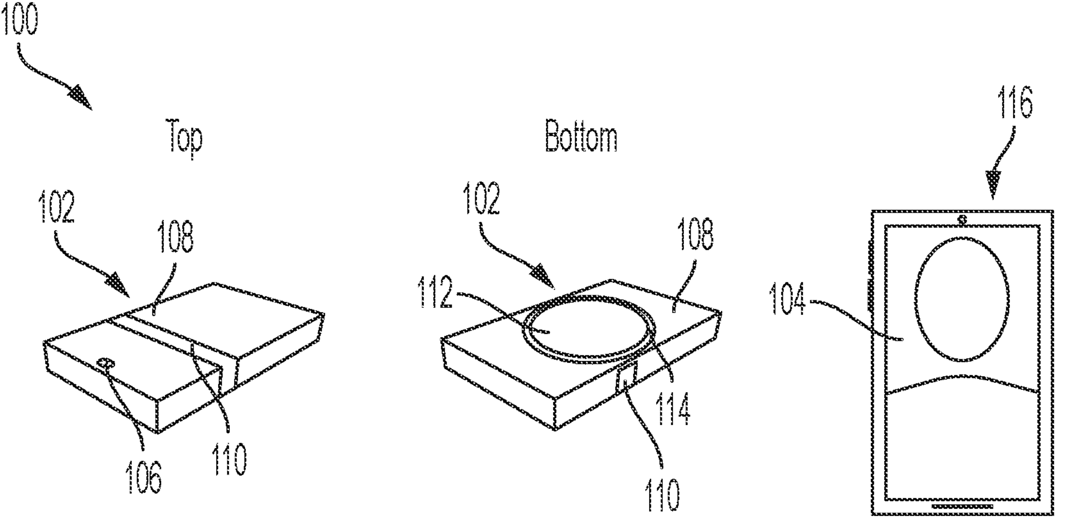
FIG. 1 depicts the example components used to implement an example methodology in accordance with aspects of the invention.

An illustrative embodiment of the present invention relates to a system that provides for a simplified device with a camera pointed at a video display. The device is configured to receive and execute commands that are displayed on the screen. The device does not require built-in communication functionality (either wireless or wired) to the remote user as such functionality can be provided by a device that is providing the video display. For example, the video display can be part of a personal electronic device, such as a personal computer, tablet, or smartphone, which could also provide the remote communication functionality. Furthermore, by using a camera pointed at the video display, the device does not need to be in electrical communication with the personal electronic device, such as over a serial, parallel, ethernet, or wireless (WIFI, Bluetooth®) which further reduces the complexity of the device and in turn makes more universal as no proprietary or specific ports, protocols, or hardware are required to interface with the device.

FIG. 1 through FIG. 8 wherein like parts are designated by like reference numerals throughout, illustrate an example embodiment or embodiments of a system and methodology of controlling a device via a video display, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts the components of a system 100 of the present invention. The system 100 makes use of device 102 and a video display 104. In this example, top and bottom views of the device 102 are provided. As can be seen, the device 102 has a camera 106 mounted in the body 108 on the top side of the device 102 which is configured to be directed at the video display 104 and is in communication with a processor (not shown) of the device. In certain embodiments, the device 102 further includes a mount 110 configured to support the video display 104. In the illustrative example, the mount 110 is a groove or notch in the body 108 of the device 102. The device 102 may also include at least one motor (not shown) in communication with the processor and motor driver. In the example shown, the at least one motor is connected to a spinning disk 112 that rides on a bearing 114 in the body 108 on the bottom side of the device 102.

The video display 104 may be any type of video display typically used in conjunction with personal electronic devices. Examples of suitable video display 104 types can include, but are not limited to, a liquid crystal display (LCD), a light-emitting diode display (LED), an in-plane switching liquid crystal display (IPS-LCD), an organic light-emitting diode display (OLED), an active-matrix organic light-emitting diode (AMOLED), or an electronic-ink display. In the example shown, the video display 104 is the display provided as part of a portable electronic device 116, such as a smartphone or tablet, that can be used to conduct video conferencing. In other embodiments, the video display 104, can be part of a laptop or connected to a personal computer type of personal electronic device. Other possible video displays 104 will be apparent to one skilled in the art given the benefit of this disclosure.

The camera 106 may be any camera of sufficient resolution and capability to capture image data from an image displayed on the video display 104 such that processing of the image data can be performed to identify a command displayed on the video display. In certain embodiments, the camera 106 matches or exceeds the resolution of the video display 104 used. For example, a camera mechanism as used in portable electronic devices 116, such as smartphones, tablets, or laptops could be used to implement the camera 106 of the device 102. Other possible cameras, resolutions, and capabilities will be apparent to one skilled in the art given the benefit of this disclosure.

Figure 2:
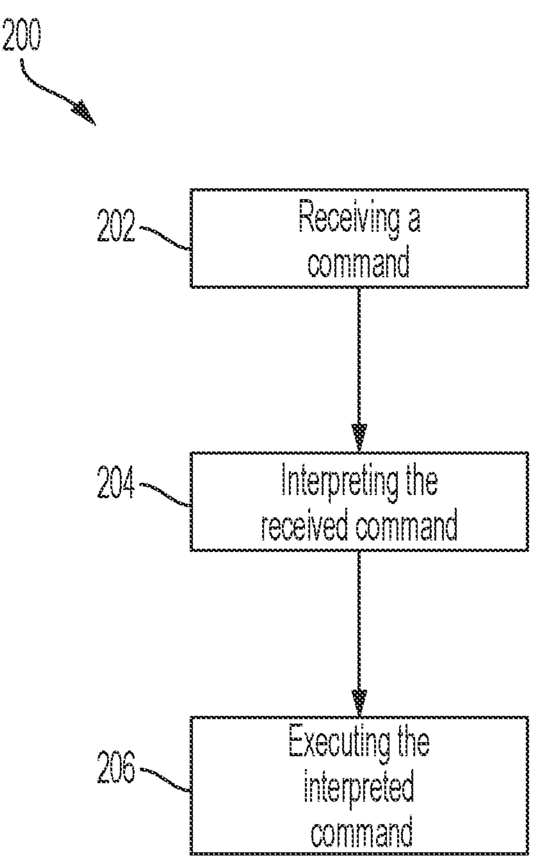
FIG. 2 is a flowchart depicting an example methodology for commanding a device via a video display in accordance with aspects of the invention.
Figure 3:
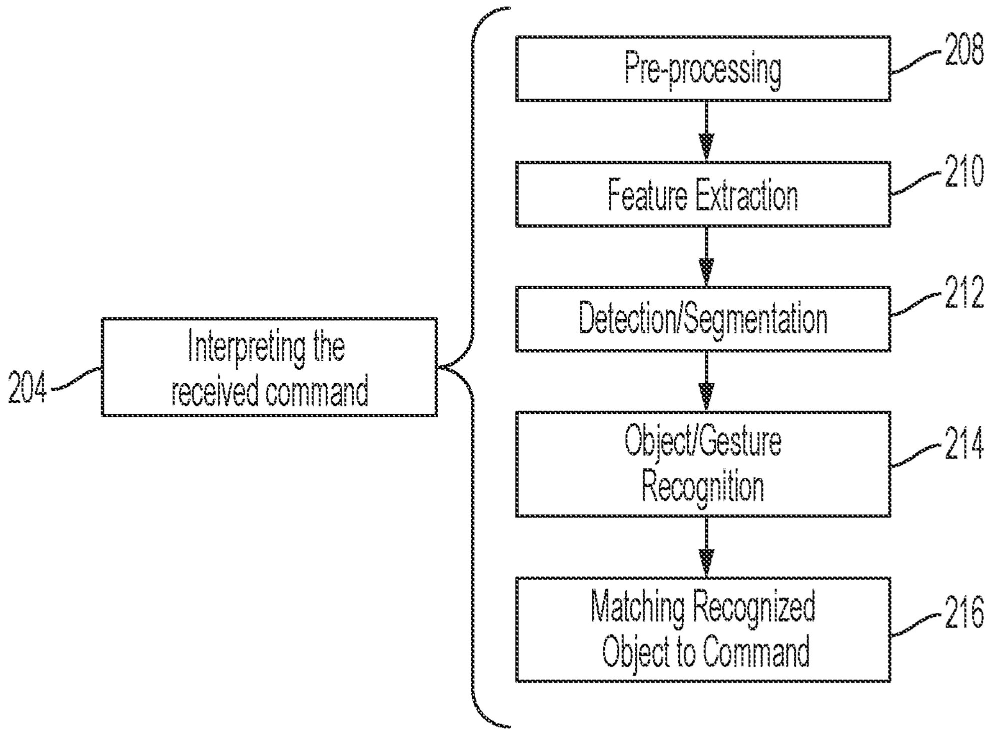
FIG. 3 is flowchart depicting an example methodology for interpreting received commands as set forth in FIG. 2.

FIG. 2 is a flow diagram depicting an example method 200 for commanding device 102 using the video display 104 while FIG. 3 depicts the method 200 being executed using the components of the system 100 depicted in FIG. 1.

As shown in FIG. 2, the first step of the method 200 involves receiving, by the camera 106 of the device 102, a command displayed on the video display 104 (step 202). The received command is then interpreted by the processor of the device 102 (step 204). The interpreted command is then executed by the processor of the device 102 which instructs the device 102 to carry out the command (step 206).

The receiving, by the camera 106, of the device 102 involves the camera acquiring image data from the video display 104. This image data includes a command provided as an object, gesture, or image included in the displayed image. In certain embodiments, a command can also be received via a microphone or other input means in addition to, or in place of, a command received by the camera (step 202). In such an embodiment, the processor of the device may be further configured to interpret and execute the command received via other means.

In certain embodiments, interpreting a command (step 204) involves, performing image recognition on the image data acquired by the camera 106 from the video display 104 to determine if it includes an object or gesture and determining when the results of the image recognition match a pre-determined trigger for instructing the device to perform the command. In some such embodiments, such as the example of FIG. 4, the image recognition further includes gesture recognition. In some embodiments, the processor of the device 102 makes use of external processing in the interpretation of a command (step 204). For example, the device may be connected to the internet and make use of remote or cloud resources for the interpreting of a command (step 204).

FIG. 3 depicts an example process for interpreting a command (step 204). Here, the image data acquired by the camera 106 previously in step 202 can be pre-processed (step 208). This pre-processing can include one or more of: re-sampling, noise reduction, contrast enhancement, scale space representation, image warping, or other processing to facilitate image recognition. Implementation of these and other possible pre-processing techniques will be apparent to one skilled in the art given the benefit of this disclosure.

In step 210, feature extraction is performed. Here lines, edges, points, corners, ridges, colors, and the like that define or indicate objects within the acquired image are determined. Next, detection and/or segmentation is performed (step 212). Here regions, areas, or objects are identified for further processing. For example, in the case of the present invention, the bottom section of the image may be designated as the area for providing commands, so this portion, area, or region (and the commands provided within it) are identified for further processing. Similarly, hands, signs, signals, or text used to provide commands may be distinguished from other portions of the image such as backgrounds, faces (or torsos), and the like. Implementation of these and other possible feature extraction techniques will be apparent to one skilled in the art given the benefit of this disclosure.

In step 214, the regions, areas, or objects detected are processed for object recognition or gesture detection. Here the processing performed may be based on the object detected. For example, if the command is provided by text, optical character recognition (OCR) may be performed to identify what the text says. The OCR processing may be performed locally on the device 102 or remotely using a web or cloud service. In the case where a sign or object is providing the command (such as an arrow or finger pointing in a direction) image searching or pattern matching (step 216) can be performed. For example, the object or sign can be compared to a listing or catalog of images to find a matching image to identify the object or sign. The listing or catalog of images can be stored within the device, or externally. In some such embodiments, the listing or catalog (and searching) can be implemented remotely using a third-party mechanism such as Google image search. Implementation of these and other possible object recognition techniques will be apparent to one skilled in the art given the benefit of this disclosure.

In some such embodiments, object recognition (step 214) may further include gestured detection. Here, gestures, such as hand gestures (e.g., swipes, pointing gestures, etc.), can be identified by the system 100. The processing of gesture detection can be performed locally on the device 102 or remotely, such as by a web or cloud service. Suitable techniques for gesture detection or recognition preferably include those techniques suitable for use with a single camera such as appearance-based approaches including deformable 2D templates and image sequences. Other techniques or implementations will be apparent to one skilled in the art given the benefit of this disclosure.

Once the object (or gesture) has been recognized (step 214) it can be matched to a command for the device 102. For example, the device 102 may store or otherwise have access to a listing or catalog containing pre-defined commands and identified triggers for the commands. The triggers can include recognized text commands, identified objects, and/or identified gestures. For example, if the command is provided by text, optical character recognition (OCR) may be performed (in step 214) to identify what the text says, which can then be matched in the listing or catalog to a command (e.g., text that says "turn right" indicating the command to turn the device right). In the case where a sign or object is providing the command, the identified object (e.g., an arrow or finger pointing in a direction) is compared to a listing or catalog which indicates the corresponding command (e.g., turn the device right). Similarly, identified gestures (e.g., gesture pointing or swipe left) can be included in the listing or catalog corresponding to a command (e.g. turn the device left). The device 102 can consult this listing or catalog to determine the appropriate command for an identified trigger.

The actions to be performed when executing a received command (step 206) can be pre-determined or otherwise defined in advance. For example, the device 102 may be provided with a listing or catalog of potential commands (and/or triggers) and the actions that correspond to the potential commands (and/or triggers). The device 102 can consult this listing or catalog to determine the appropriate action(s) to perform in response to the received command. These actions can then be performed or otherwise executed by the device 102. These actions are based on the hardware and functionality of the device. For example, a command to move in a particular direction corresponds to the action wherein the processor of the device 102 activates or energizes a motor of the device 102 to rotate or move the device in the indicated direction. In some embodiments, the duration of activation (as well as the resulting movement) is based on the time the object is detected as present in the image displayed on the display device such as video display 104. In other embodiments, the duration of activation may be controlled by the size of a gesture (e.g., large or small motion in gesture). Similarly, the speed of the motor could be controlled by the speed of the gesture.

Table 1 provides an example of a listing or catalog of commands, triggers and actions.

TABLE 1

TABLE 1-continued

| Command | Trigger | | Action |
|---|---|---|---|
| Turn Right | Identified Audio: | "Right" "Turn Right" | Activate motor: forward direction |
| | Identified Text: | "Right" "Turn Right" | |
| | Identified Object: | hand pointing right arrow pointing right | |
| | Identified Gesture: | Swipe right Pointing right | |
| Turn Left | Identified Audio: | "Left" "Turn Left" | Activate motor: reverse direction |
| | Identified Text: | "Left" "Turn Left" | |
| | Identified Object: | hand pointing left arrow pointing left | |
| | Identified Gesture: | Swipe left Pointing left | |
| Halt | Identified Audio: | "Stop" "Halt" | Stop motor |
| | Identified Text: | "Stop" "Halt" | |
| | Identified Object: | Hand in halt position Stop sign | |
| | Identified Gesture: | Halt gesture | |

In other embodiments, the device 102 may make use of artificial intelligence (A.I) or machine learning to determine new commands, triggers, and/or actions. Here the device 102 or remote functionality, such as a web or cloud-based resource can be trained using training data to identify new commands, triggers, and/or actions and improve the interpretation of commands including the identification of objects and gestures used to provide commands. One skilled in the art would understand how A.I., or machine learning, can be implemented to provide these improvements. For example, any number of machine learning algorithms including but not limited to: linear regression, logistic regression, decision tree, SVM algorithm, Naïve Bayes Algorithm, KNN algorithm, K-means, Random forest algorithm, dimensionality reduction algorithms, and gradient boosting algorithm could be used or otherwise implemented.

By receiving the commands via the video display 104, the need for proprietary or dedicated hardware or software to provide control commands for the device 102 from a remote operator is eliminated thereby allowing the device to be simpler and have a more universal application. That is, the video calls or other remote display functionality provided by a portable electronic device 116, such as a smartphone, which provides the display on the video display 104, can also serve as the means for providing commands to remote control the device 102. An example of this can be seen in FIG. 3.

Figure 4:
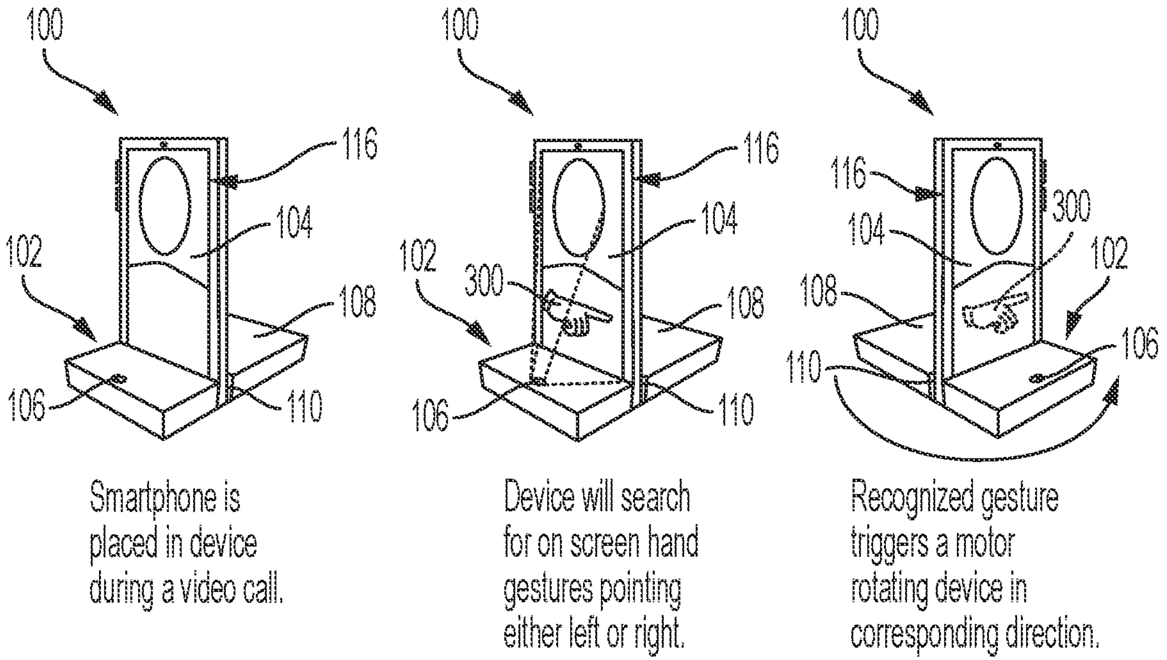
FIG. 4 depicts an implementation of the example methodology using example components in accordance with aspects of the invention.

In the images of FIG. 4, the system 100 of FIG. 1 is used to perform the methodology of FIG. 2 and FIG. 3. In the left-most image, the portable electronic device 116 is placed on the mount 110 on the body 108 of the device 102 such that that camera 106 is directed at the video display 104. The portable electronic device 116 can then be used to conduct a video call. The video call can leverage any video communication platform, including but not limited to Zoom®, Skype®, Teams®, FaceTime®, WhatsApp®, Amazon Alexa®, etc. In the middle image, the camera 106 of the device receives a command 300 displayed on the video display 104 as set forth in step 202 of FIG. 2. In this example, the command 300 is a gesture pointing in a direction provided by the remote participant in the video call. It should be understood that the command 300 displayed on the video could be an image and/or text instead of, or in addition to, a gesture. Other possible commands will be apparent to one skilled in the art given the benefit of this disclosure. Once a command 300 is received it is interpreted by the processor of the device 102 to determine the appropriate action to be performed in response to the command 300, as set forth in step 204 of FIG. 2. In the rightmost image, the interpreted command is then executed by the processor and motor driver 522, resulting in, in this example, the device 102 rotating in the direction indicated by the gesture. It should be understood that the action performed in response to a command can be any number of actions depending on the functionality of the device 102.

In some embodiments, such as the example of FIG. 4, additional image pre-processing may also be necessary to receive the command 300 via the camera 106. An example of this can be seen in FIG. 5.

Figure 5:
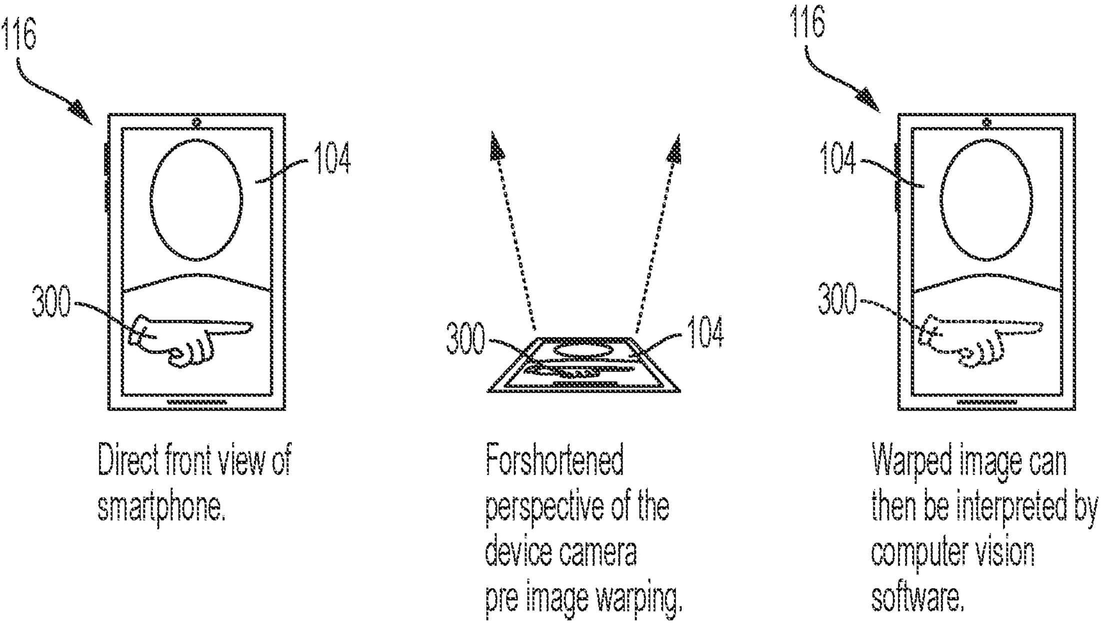
FIG. 5 depicts implementation details of the example methodology using the example components in accordance with aspects of the invention.

The left-most image of FIG. 5 depicts a front direct view of the video display 104. However, the position of the camera 106 in the body 108 of the device 102 results in a view as seen in the middle image of FIG. 5 in which objects, texts, or gestures may be difficult to discern. Thus, image pre-processing, such as image warping, can be performed on the image received by the camera 106 resulting in the image shown in the rightmost image of FIG. 5 allowing the device 102 to receive and interpret the command(s) displayed.

In certain embodiments, the device 102 is a telepresence robot. An example of such a telepresence robot 500 can be seen in FIG. 6 and FIG. 7.

Figure 6:
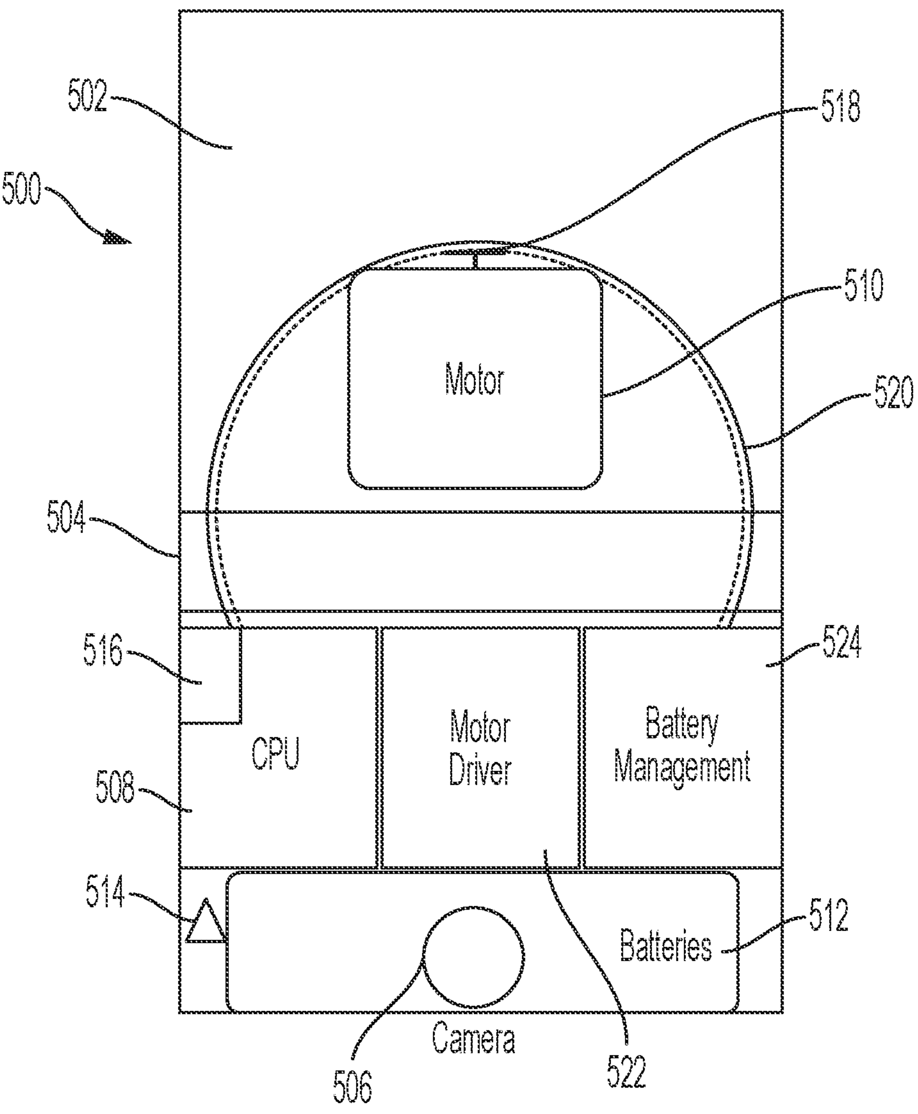
FIG. 6 is top view high-level representation of an example telepresence robot in accordance with aspects of the invention.
Figure 7:
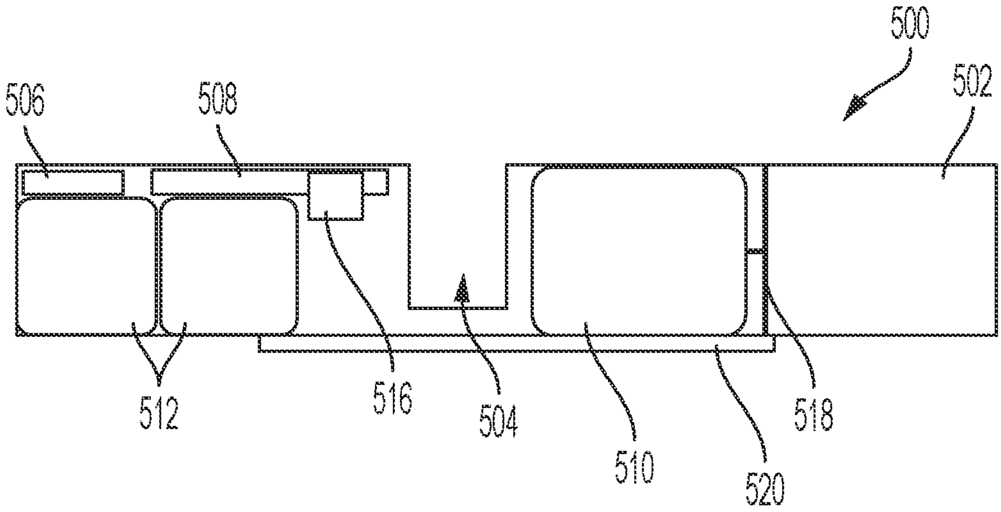
FIG. 7 is a side view representation of the example telepresence robot of FIG. 5 in accordance with aspects of the invention.

The telepresence robot 500 of FIG. 6 and FIG. 7. includes a body 502, a mount 504, a camera 506, a processor 508, a motor driver 522, a battery management 524, at least one motor 510, and a power supply 512, such as batteries. In certain embodiments, telepresence robot 500 further includes a microphone 514. In still other embodiments, the telepresence robot 500 further includes communication functionality 516 such as wireless (Wi-Fi, Bluetooth®) or wired (USB) connectivity.

The body 502 is sized and configured to hold and support the components of the telepresence robot 500 as well as a video display 104. The body can be formed of any suitable material the provided the necessary rigidity to hold and support the components. Examples of suitable materials include plastic, metal, carbon fiber, or any combination thereof. Other suitable materials and configurations will be apparent to one skilled in the art given the benefit of this disclosure.

The mount 504 is configured to support a video display 104. In this embodiment, the mount 504 is a groove or notch in the body 502 configured and sized to receive and hold the edge of a portable electronic device 116 having a video display 104 in position so the video display 104 is visible to the camera 506. Other possible mounts will be apparent to one skilled in the art given the benefit of this disclosure.

The camera 506 is mounted in the body 502, directed at the video display 104 on the mount 504, and oriented to receive video images of commands displayed on the video display 104. The camera can be any camera with a suitable resolution, focus, and field of view to be able to receive commands from the video display 104 of the portable electronic device 116 supported in mount 504.

The processor 508 is in communication with the camera 506 and interprets and executes commands received by the camera 506. The processor 508 can be any processor capable of providing the required functionality of the telepresence robot 500. It should be further understood that the processor 508 can also be multiple processors.

The motor driver 522 is in communication with the processor 508 and regulates power being fed to the motor 510, thus controlling its degree of rotation and speed. It should be further understood that the motor driver 522 can also be multiple motor drivers, and other configurations understood by those of skill in the art to be equivalent.

The at least one motor 510 is in communication with the processor 508 and motor driver 522 and serves to motivate at least a portion of the robot 500. A command received by the camera 506 and interpreted and executed by the processor 508 and motor driver 522, results in actuation of the motor 510 and movement of at least a portion of the robot 500 in accordance with the command. In the example of FIG. 6 and FIG. 7, the motor 510 drives a gear 518 that in turn drives a spinning disk 520 causing the body 502 of the robot 500 to rotate in a specified direction.

The power supply 512 provides the power for the components of the telepresence robot 500. The power supply 512 may be a power converter for converting externally provided power (such a USB power or conventional AC power) or, in the case of FIG. 6 and FIG. 7, batteries.

The battery management 524 regulates the system power consumption and distribution, allowing safe and energy-efficient operation.

In embodiments where the telepresence robot 500 further includes a microphone 514, the processor 508 is in communication with the microphone 514 and configured to interpret and execute commands received by the microphone 514. Suitable microphones and microphone configurations will be apparent to one skilled in the art given the benefit of this disclosure In embodiments where the telepresence robot 500 further includes communication functionality 516, the processor 508 is in communication with the hardware necessary to provide the communication functionality and configured to process data received via the communication functionality 516 including the interpretation and execution of commands received by the communication functionality. Furthermore, software updates and other programming for the telepresence robot can be received via the communication functionality. Examples of suitable communication functionality include wireless (Wi-Fi and Bluetooth®) as well as wired (USB) communication. Other Suitable communication functionality 516 will be apparent to one skilled in the art given the benefit of this disclosure.

Figure 8:
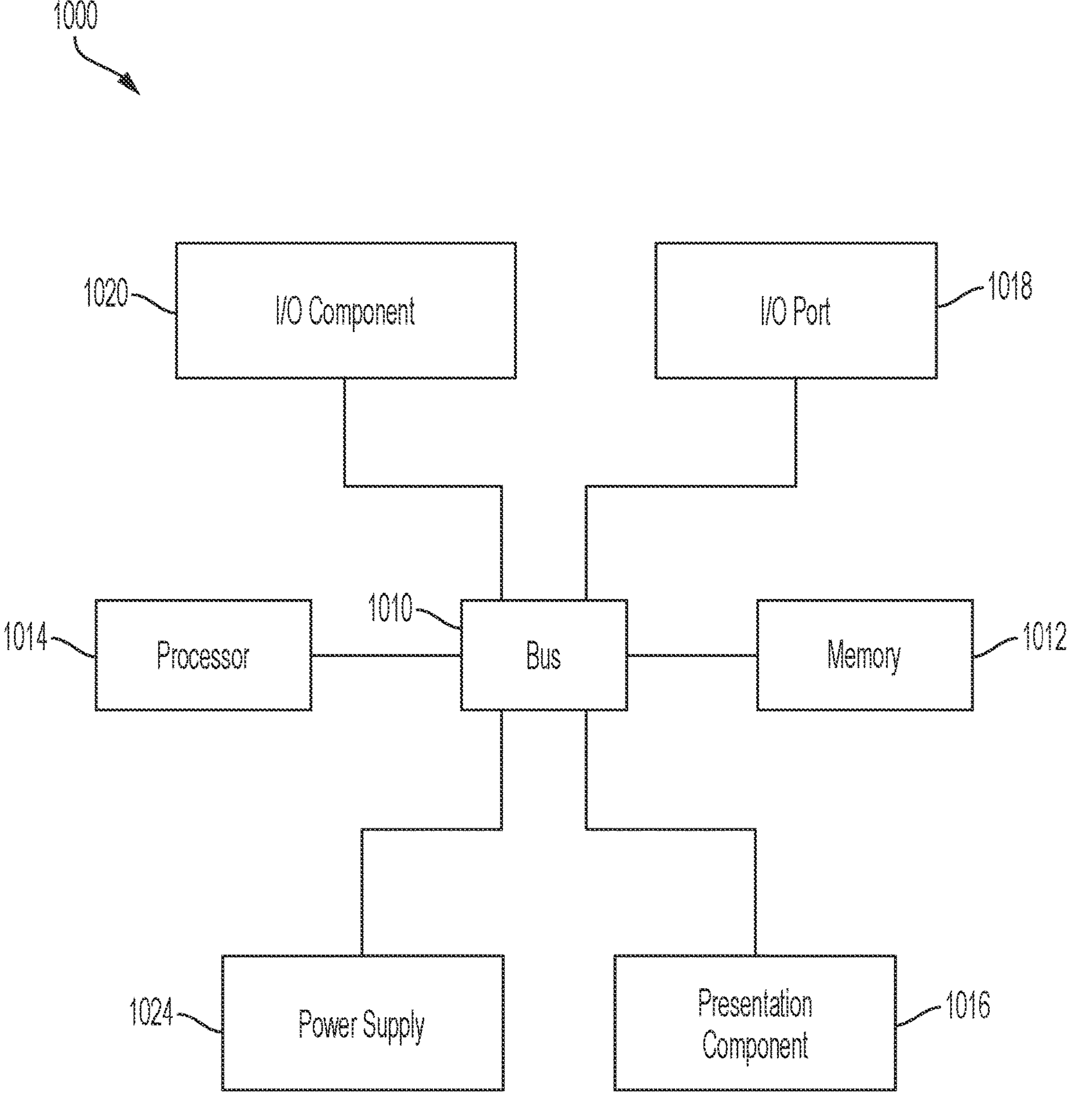
FIG. 8 is a diagrammatic illustration of a high-level architecture configured for implementing processes in accordance with aspects of the invention.

One illustrative example of a computing device 1000 used to provide the functionality of the present invention, such as provided by the device 102 or telepresence robot 500 or personal computing device (such as portable electronic device 116), is depicted in FIG. 8. The computing device 1000 is merely an illustrative example of a suitable special-purpose computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014 (such as processors 508), one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors 1014 (such as processor 508) that read data from components such as the memory 1012, the various I/O components 1016, etc. Presentation component (s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a camera (such as cameras 106, 506) microphones (such as microphone 514), joystick, recording device, game pad, satellite dish, scanner, printer, wireless device, networking device, and the like.

The power supply 1024 (such as power supply 512) can include batteries. Other suitable power supply or batteries will be apparent to one skilled in the art given the benefit of this disclosure.

The term “robot” is utilized herein in accordance with its conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

As utilized herein, the terms “comprises” and “comprising” are intended to be construed as being inclusive, not exclusive. As utilized herein, the terms “exemplary”, “example”, and “illustrative”, are intended to mean “serving as an example, instance, or illustration” and should not be construed as indicating, or not indicating, a preferred or advantageous configuration relative to other configurations. As utilized herein, the terms “about”, “generally”, and “approximately” are intended to cover variations that may existing in the upper and lower limits of the ranges of subjective or objective values, such as variations in properties, parameters, sizes, and dimensions. In one non-limiting example, the terms “about”, “generally”, and “approximately” mean at, or plus 10 percent or less, or minus 10 percent or less. In one non-limiting example, the terms “about”, “generally”, and “approximately” mean sufficiently close to be deemed by one of skill in the art in the relevant field to be included. As utilized herein, the term “substantially” refers to the complete or nearly complete extend or degree of an action, characteristic, property, state, structure, item, or result, as would be appreciated by one of skill in the art. For example, an object that is “substantially” circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of “substantially” is equally applicable when utilized in a negative connotation to refer to the complete or near-complete lack of an action, characteristic, property, state, structure, item, or result, as would be appreciated by one of skill in the art.

Further, the terms “robot” and “bot” are utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for commanding a device via a video display, the device having a camera directed at the video display and in communication with a processor, the method comprising:
receiving, by the camera directed at the video display, a command displayed on the video display;
interpreting, by the processor, the command received by the camera; and
executing, by the processor, the interpreted command by instructing the device to carry out the command;
wherein a remote user controls the device without requiring a proprietary control mechanism at the location of the remote user.

2. The method of claim 1, wherein the command comprises an image displayed on the video display.

3. The method of claim 2, wherein the command comprises text that is displayed on the video display.

4. The method of claim 1, wherein the command comprises a gesture that is displayed on the video display.

5. The method of claim 1, wherein the video display displays content that is sourced from a remote location from the camera and video display.

6. The method of claim 5, wherein the video display comprises a screen of a portable electronic device.

7. The method of claim 1, wherein interpreting the command comprises:
performing image recognition on the command displayed on the video display; and
determining when results of image recognition match a pre-determined trigger for instructing the device to perform the command.

8. The method of claim 7 wherein determining when results of image recognition match a pre-determined trigger for instructing the device to perform the command is performed by consulting a listing of commands and triggers.

9. The method of claim 7, wherein the image recognition comprises gesture recognition.

10. The method of claim 1, wherein interpreting the command further comprises using machine learning and/or artificial intelligence to determine what command is displayed on the video display and/or the action that is to be carried out in response to the command.

11. The method of claim 1, wherein the device further includes a microphone and can further receive commands by the microphone that are interpreted and executed by the processor.

12. The method of claim 1, wherein executing, by the processor, the interpreted command by instructing the device to carry out the command comprises:
consulting a listing of commands and actions to determine the appropriate action for the received command; and
performing the determined appropriate action.

13. The method of claim 1, wherein the device comprises:
a telepresence robot comprising:
a body;
a mount configured to support the video display;
the camera directed at the video display on the mount;
the processor in communication with the camera; and
at least one motor in communication with the processor to motivate the body of the robot;
wherein the command received by the camera and interpreted and executed by the processor results in actuation of the at least one motor and movement of the telepresence robot in accordance with the command received.

14. The method of claim 13, wherein the command received is a command to rotate the body in a specified direction.

15. The method of claim 13, further comprising the video display supported by the mount.

16. A telepresence robot receiving commands from a remote location via a video display, the robot comprising:
a body;
a mount supporting a video display;
a camera directed at the video display on the mount oriented to receive video images of commands displayed on the video display;
a processor in communication with the camera that interprets and executes commands received by the camera; and
at least one motor in communication with the processor that motivates at least a portion of the robot;
wherein the command received by the camera and interpreted and executed by the processor results in actuation of the motor and movement of at least a portion of the robot in accordance with the command; and
wherein a remote user controls the telepresence robot without requiring a proprietary control mechanism at the remote user's location.

17. The robot of claim 16, wherein the command comprises an image displayed on the video display.

18. The robot of claim 16, wherein the command comprises text displayed on the video display.

19. The robot of claim 16, wherein the command is a gesture performed by an individual displayed on the video display.

20. The robot of claim 16, wherein the video display displays content sourced from a remote location.

21. The robot of claim 20, wherein the video display comprises a screen of a portable electronic device.

22. The robot of claim 16, wherein the processor interprets and executes the commands by:
performing image recognition on the command displayed on the video display; and
determining when results of image recognition match a pre-determined trigger for instructing the robot to perform the command.

23. The robot of claim 22 wherein determining when results of image recognition match a pre-determined trigger for instructing the robot to perform the command is performed by consulting a listing of commands and triggers.

24. The robot of claim 22, wherein processor interprets and executes the commands by:
consulting a listing of commands and actions to determine an appropriate action for the received command; and
performing the determined appropriate action.

25. The robot of claim 22, wherein image recognition comprises gesture recognition.

26. The robot of claim 16, wherein the processor interprets and executes the commands by using machine learning and/or artificial intelligence to determine what command is displayed on the video display and/or an action that is to be carried out in response to the command.

27. The robot of claim 16, further comprising:
a microphone, in communication with the processor, for receiving audio commands;
wherein a command received by the microphone is interpreted and executed by the processor and results in actuation of the motor and movement of at least a portion of the robot in accordance with the command.

28. The robot of claim 16, wherein the command received is a command to rotate the body of the robot in a specified direction.

* * * * *